United States Patent [19]
Feneziani

[11] 3,799,223
[45] Mar. 26, 1974

[54] TELESCOPING CONDUIT

[75] Inventor: George Feneziani, Buffalo, N.Y.

[73] Assignee: Stauffer Chemical Company, Westport, Conn.

[22] Filed: May 19, 1972

[21] Appl. No.: 255,296

Related U.S. Application Data

[63] Continuation of Ser. No. 48,234, June 22, 1970, abandoned.

[52] U.S. Cl................ 141/388, 193/30, 239/165, 285/45, 285/165, 285/226, 285/299, 285/302
[51] Int. Cl............................................. B65b 3/10
[58] Field of Search...... 138/108, 120, 144, DIG. 3; 137/278; 141/387, 388; 193/30; 92/168

[56] References Cited
UNITED STATES PATENTS

| | | | |
|---|---|---|---|
| 706,037 | 8/1902 | Elward | 285/299 |
| 2,920,908 | 1/1960 | Mitchell | 285/299 |
| 2,657,074 | 10/1953 | Schwester et al. | 285/226 |
| 1,400,658 | 12/1921 | Brown | 193/30 |
| 2,969,812 | 1/1961 | De Ganahl | 138/144 |
| 2,719,653 | 10/1955 | Bledsoe | 141/388 |
| 263,264 | 8/1882 | Walsh | 285/165 |
| 289,265 | 11/1883 | Hurly | 285/165 |
| 3,390,854 | 7/1968 | Sherburne | 308/DIG. 7 |
| 3,427,051 | 2/1969 | White et al. | 285/45 |

FOREIGN PATENTS OR APPLICATIONS

| | | | |
|---|---|---|---|
| 981,498 | 1/1965 | Great Britain | 285/302 |
| 417,243 | 1/1967 | Switzerland | 285/302 |

*Primary Examiner*—Houston S. Bell, Jr.
*Attorney, Agent, or Firm*—Daniel S. Ortiz

[57] ABSTRACT

A leakproof telescoping conduit which comprises two slideably connected rigid conduits having disposed over the smaller conduit a flexible conduit and having means at the point of the slideable connection for holding and compressing packing material to control the friction between the rigid conduits and to prevent leaks at the slideable connection.

7 Claims, 7 Drawing Figures

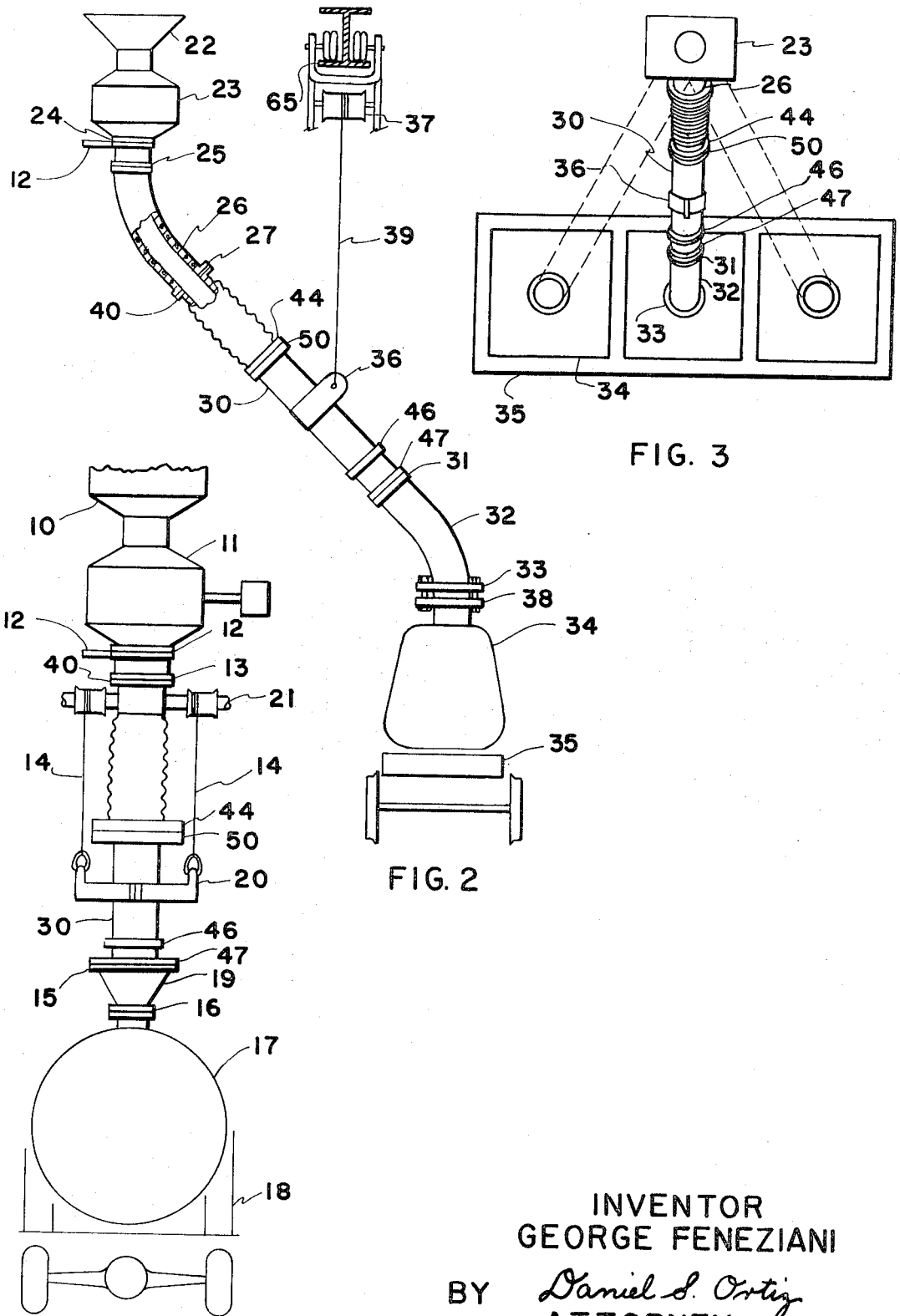

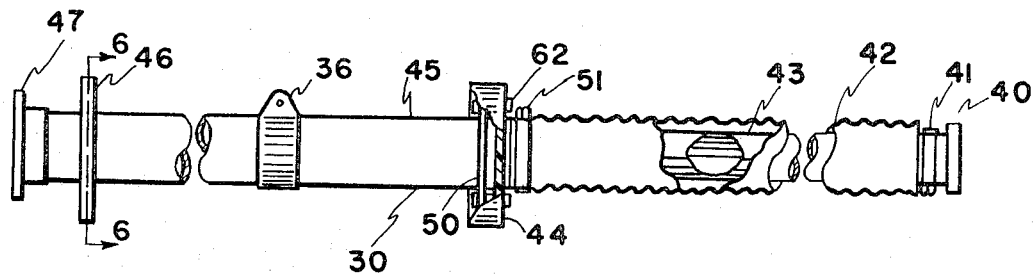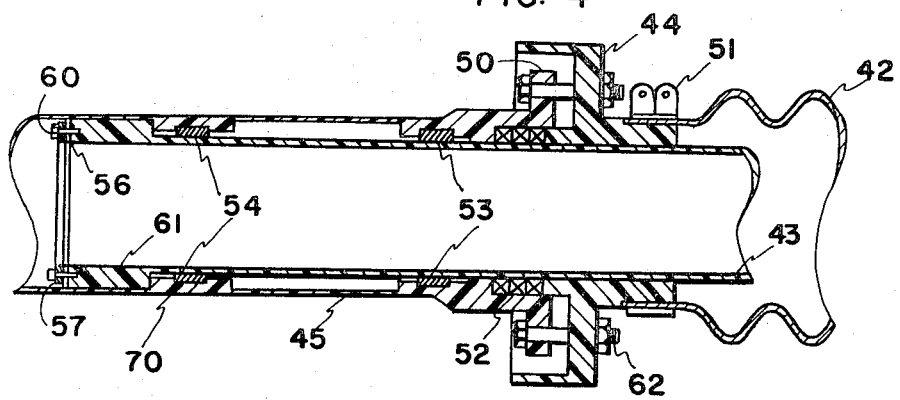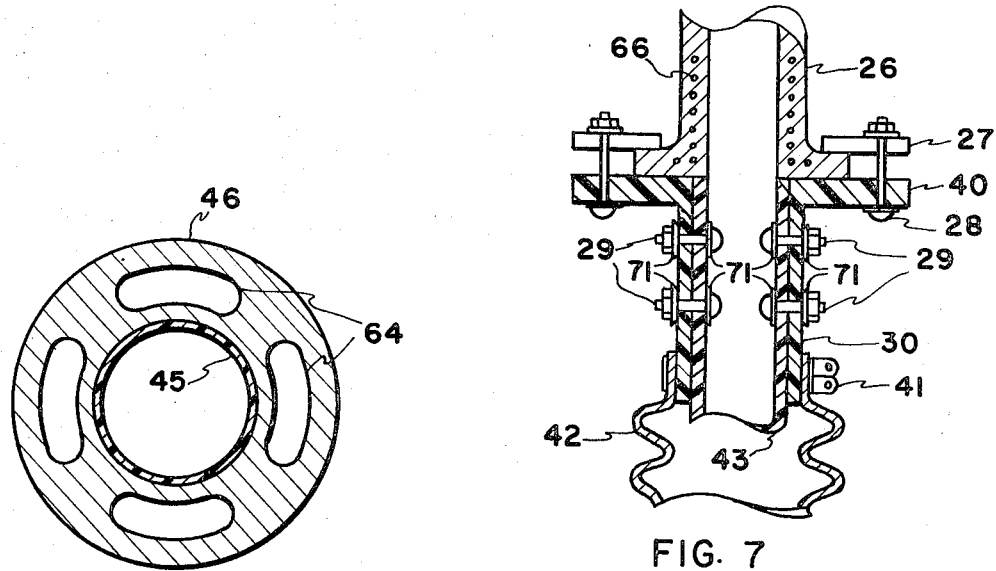

TELESCOPING CONDUIT

CROSS-REFERENCE TO RELATED APPLICATIONS

This application is a continuation of copending application Ser. No. 48,234 filed June 22, 1970, now abandoned.

BACKGROUND OF THE INVENTION

This invention relates to a telescopic conduit. Particularly, the invention concerns a gas tight telescopic conduit. More particularly, the invention relates to a gas tight telescopic conduit which can be fabricated in large diameters of light weight materials and is particularly useful as a conduit for transferring air or moisture sensitive solid material.

The transfer of air and moisture sensitive solid materials between a fixed container and a movable container is generally accompanied by allowing the materials to fall under the influence of gravity from one container to the other through a gas tight conduit. A transfer of materials by this method generally requires that the movable container be precisely positioned in relation to the fixed container and that a gas tight connection be made by inserting a rigid pipe conduit between the two containers. Small deviations from precise positioning have been accommodated by the incorporation of a relatively short flexible conduit at the end of the rigid conduit connection.

The positioning and connection of containers is generally difficult and time consuming since it requires the moving of large heavy containers to precise positions and making connections with large diameter heavy connecting conduits.

Gas tight telescopic conduits such as described in U.S. Pat. No. 3,143,146 are generally unsatisfactory for transferring solid materials since the solid materials tend to become lodged in the convolutions or wrinkles of the flexible conduit and either prevent it from telescoping or plug the conduit. The flexible conduit as used in U.S. Pat. No. 3,143,146 is exposed to the abraiding action of the solid particles flowing therein. This abraiding action can be detrimental to thin flexible conduits.

It is the object of the present invention to provide a gas tight telescopic conduit which permits gas tight connections to be made between two containers without a precise positioning of the containers. It is a further object of the present invention to provide a lightweight, gas tight, corrosion resistant telescopic conduit which is useful for transferring air or moisture sensitive solid materials.

It is a further object of the present invention to provide a gas tight, leakproof conduit which is free of internal restrictions to flow.

It is also an object of the present invention to provide a gas tight, telescopic conduit which can be manufactured in large diameters.

SUMMARY OF THE INVENTION

It has been discovered that the objects of this invention can be achieved by a combination of impermeable flexible conduits and rigid telescopic conduits. According to the present invention, a gas tight telescopic conduit is provided by a combination comprising a first rigid conduit having disposed at one end a means for making a tight connection to an aperture and slideably connected at the other end to a second rigid conduit larger in diameter than the first rigid conduit and having connected thereto near the point of the slideable connection a flexible impermeable conduit, the flexible impermeable conduit is connected to the first rigid conduit near the point of the means for connection to the aperture. The second rigid conduit has a means for a tight connection to an aperture disposed at the end away from the end having the slideable connection.

The invention is best understood by referring to the accompanying drawings.

BRIEF DESCRIPTION OF THE DRAWINGS

FIG. 1 is an elevational view of the telescopic conduit of the present invention mounted in position for loading containers on a transport vehicle which can be positioned directly below the fixed container.

FIG. 2 is an elevational view of the telescopic conduit of the present invention in combination with a non-collapsible impermeable flexible conduit mounted in position for loading a plurality of containers without moving the transport vehicle.

FIG. 3 is a top plan view of FIG. 2.

FIG. 4 is a view of the telescopic conduit.

FIG. 5 is a detail view in partial section of the slideable connection of the telescopic conduit.

FIG. 6 is a detail view of the hand hold for positioning the telescopic conduit.

FIG. 7 is a detail view in section of the joint between the flexible conduit and the telescopic conduit.

The telescopic conduit of this invention comprises at least two slideably connected rigid conduits and a flexible conduit larger in diameter than the smaller of the two rigid conduits and attached to the larger rigid conduit at a point near the slideable connection and to the smaller rigid conduit at a point some distance from the point of the slideable connection. The telescopic conduit contemplated within the scope of this invention can comprise more than two rigid conduits slideably connected with a flexible conduit attached thereto.

The conduits are generally designed to contain the materials within the conduits and prevent contact with the stmosphere, and are therefore termed gas tight and leak proof.

The flexible conduit which is used to form the telescopic conduit, of the present invention, must be able to withstand penetration by the atmosphere and also by the contents of the telescopic conduit. It must of necessity be fabricated of materials which have low permeabilities to air and to the contents of the conduit. Since the flexible conduits have low permeation rates, they are described herein as being impermeable.

DESCRIPTION OF THE PREFERRED EMBODIMENTS

In one embodiment of this invention, FIG. 1 the stationary container 10 is a hopper, which is connected to bin 17 on a suitably positioned transport vehicle such as truck 18 by means of telescopic conduit 30. The telescopic conduit is shown in the extended position. The flow of material from the hopper 10 is controlled by a suitable valve means 11 such as a rotary feeder disposed between the hopper 10 and the telescopic conduit 30. Sliding valve 12 disposed between rotary valve 11 and the telescopic conduit 30 can be used to seal-off the hopper when a bin is being connected or disconnected from the telescopic conduit.

The telescopic conduit is attached to the sliding valve means by means of flange and gasket connection between flanges 13 and 40 and to the moveable container 17 by means of flange and gasket connection 16. The embodiment shows the use of flanges with suitable gasket materials to make the leakproof connection but other means of making leakproof connections can be employed within the scope of the present invention. The size of the telescopic conduit is matched to aperture of container 17 by means of reducing member 19 connected to telescopic conduit 30 by flange and gasket connection between flanges 47 and 15. The telescopic conduit 30 can be retracted by retracting means 21 connected to the telescopic conduit 30 by cables 14 and harness 20 so that the transportably mounted container 17 can be removed when it become filled.

In another embodiment of this invention, FIG. 2 the stationary container 22 is a hopper, which is connected to bin 34 on a suitably positioned transport vehicle such as railroad flatcar 35 by means of non-collapsible flexible conduit 26 and telescopic conduit 30. The telescopic conduit 30 is shown partially extended. The flow of material from hopper 22 is controlled by means of rotary valve 23 which also may have provisions for breaking lumps. The material flows through suitable slide valve 24 which is connected to flexible conduit 26 by flange and gasket connection 25. The flexible conduit can be a non-collapsible impermeable elastomeric hose or can be a rotary joint. Due to low cost and light weight the flexible elastomeric conduit is preferred. The impermeable, flexible non-collapsible conduit 26 permits the telescopic conduit to be moved laterally; allowing connections to be made to a plurality of transportable containers without a movement of the transport vehicle. The telescopic conduit 30 is connected to the flexible conduit by means of flange connection between flanges 27 and 40. The telescopic conduit is connected to moveable container 34 through connecting piece 32 which is fitted with Van Stone flange 33 so that a leakproof connection can be made with moveable container 34 at flange 38. Connecting piece 32 form a leakproof connection with telescopic conduit 30 by flange and gasket connection between flanges 31 and 47. The connections are made gas tight by means of the flange and gasket connections. The gas tight connections can be made by means other than flanged and gasket connections and be within the contemplation of the present invention. The telescopic conduit can be extended and retracted by means of moveable hoisting means 37 connected to telescopic conduit 30 by cable 39 connected to collar 36. The position of telescopic conduit 30 can be changed by means of moving hoist means 37 parallel to the moveable containers along track 65.

The telescopic conduit is shown with the larger rigid conduit connected to the receiving container. It is preferred that the telescopic conduit be utilized in this manner since the materials to be transferred passes from small to large conduit and there is no restriction in the path of the flow. The positioning of the telescopic conduit is facilitated by means of hand holder 46 which permits the large diameter conduits to be precisely positioned easily by one man.

FIG. 3 is a top plan view of FIG. 2 and the numbers refer to the same members as shown in FIG. 2. The rotary valve 23 is shown connected to moveable containers 34 on a moveable vehicle like railroad flatcar 35 by means of telescopic conduit 30 and impermeable non-collapsible conduit 26. The telescopic conduit is connected to container 34 by means of connecting piece 32. The dotted diagrams shows telescopic conduit 30 connected to the two other containers 34 mounted on transport vehicle 35.

FIG. 4 is a full view of the telescopic conduit. The telescopic conduit is comprised of two slideably connected rigid conduits 43 and 45 and an impermeable flexible conduit 42. The two rigid conduits are of different sizes so that the smaller one 43 can slide within the larger conduit 45. The telescopic conduit is made leakproof by making a sealed connection between the impermeable flexible conduit 42 and the larger rigid conduit 45 at the point of the slideable connection and making a leakproof connection with the smaller rigid conduit 43 at some distance from the point of the slideable connection. In FIG. 4 the flexible conduit 42 is a bellows which is attached to conduit 43 by means of clamp 41 which makes a seal at flange 40. Flange 40 provides a means of making a leakproof connection to another suitable element. The impermeable flexible conduit 42 is attached to conduit 45 by means of clamp 51 which forms a leakproof seal with flange 44 which is connected to rigid conduit 45. It is not necessary to use a bellows for the flexible conduit except in cases where the internal pressure is high or the length of the flexible conduit is long. Generally, any impermeable flexible conduit able to withstand the pressure in the system can be employed. The flexible conduit will generally not be subjected to the pressure in the system unless a leak should develop at flange 40 or flange 44 where the flange connects to the conduit. Flange 44 is connected to flange 50 and rigid conduit 45 by means of bolts 62. The bolts 62 apply pressure to the flanges which compress packing in flange 50 to prevent leaks at the slideable connection and to control the amount of friction between rigid conduits 43 and 45. Attached to rigid conduit 45 is flange 47 so that the conduit can form a leakproof connection with another suitable element. Conduit 45 has attached to it collar 36 so that it can be attached to the moveable hoisting means and hand hold 46 to permit easy positioning of large diameter conduits.

Although the telescopic conduit can be advantageously fabricated and used in large diameters to handle air and moisture sensitive solid materials at low to moderate pressure the telescopic conduit can be designed in sizes to handle liquids and gases at moderate to high pressure. The pressure limitation is generally the flexibility of the flexible conduit which decreases as it is designed to withstand higher pressures.

FIG. 5 is a view in partial section of the telescopic conduit of FIG. 4. The numbers correspond to the same members as shown in FIG. 4. The rigid conduit 43 is disposed to telescope within rigid conduit 45. The flange connection is composed of protector flange 44, which can be adjusted to apply pressure on packing 52 in flanged end 50 of conduit 45. The pressure on the packing 52 can be adjusted by means of bolts 62 to make the connection gas tight and to adjust the amount of friction between the rigid conduits 43 and 45. The packing 52 can be Teflon of square braided design. The impermeable flexible conduit 42 is attached to flange 44 by means of clamp 51. The clamp provides a gas tight seal between the impermeable flexible conduit and flange 44. The conduit guides 53 and 54 are collars which maintain the rigid conduits in substantial alignment. The collars can be made of polymeric materials such as Teflon to facilitate movement of the conduits. The wiper ring 56 maintains the inner portion of rigid conduit 45 clean so that the telescopic movement of the rigid conduits is not impeded. The wiper ring is held in place by retainer 57 and bolts 60. The enlarged section 61 of conduit 43 provides a limiting stop for extension of the telescopic conduits by abutting against guide holder 70. The limiting stop prevents the rigid conduit 43 from being withdrawn from conduit 45. The protector flange 44 covers flange 50 preventing water from contacting packing 52.

FIG. 6 is a section along 6—6 of FIG. 4 showing the hand hold 46 which is useful in positioning the conduit. The numbers correspond to the numbers as shown in FIG. 4. The hand hold 46 consists of a ring surrounding conduit 45 containing openings 64 positioned such that the ring can be grasped by hand and moved into alignment with the connecting flange.

FIG. 7 is a view in section of the connection between the non-collapsible impermeable flexible conduit 26 and the telescopic conduit 30 of FIG. 2. Non-collapsible flexible conduit 26 which has wires 66 embedded in the walls to prevent the conduit from collapsing is connected to the rigid conduit 43 of the telescopic conduit by means of bolts 28 which makes a tight flange connection between flange 27 and flange 40. No gasket is shown but connection can be made leakproof due to elastomeric properties of conduit 26. Flange 40 is attached to rigid conduit 43 by means of nut and bolt and gasket fasteners 29. The nuts and bolts are supplied with gaskets 71 where they contact the rigid conduit to seal the bolt holes. Flexible conduit 42 is attached to rigid conduit 43 at flange 40 by means of clamp 41 which forms a seal. The flexible conduit 42 can be attached to flange 40 at a level below bolts 29 which then remain outside of flexible conduit 42. The seal is then maintained by gaskets 71 under bolts 29.

The rigid conduits useful in the practice of the present invention can be fabricated from impermeable rigid materials such as metals, plastics, reinforced plastics and plastic coated vegetable fibers and the like. Due to their light weight high strength and corrosion resistant characteristics it is preferred to fabricate the telescopic conduit from fiberglass reinforced plastic. Fiberglass reinforced epoxy and polyester compositions have been found to be useful in the practice of the present invention. Plastic is herein to refer to the thermoplastic and thermoset polymeric materials which have properties suitable for structural utilization.

The telescopic conduit of the present invention can be utilized at from subatmospheric to superatmospheric pressure. The maximum pressure at which the present invention can be used is determined by the ability of the impermeable flexible conduit to withstand the pressure and still have a sufficient amount of flexibility to permit movement of the telescoping members.

The telescopic conduit of the present invention can be useful when fabricated in sizes from less than one inch in diameter to sizes greater than about 12 inches in diameter.

The telescopic conduit of the present invention can be utilized to transfer gases, liquids or solid materials but it is particularly useful in large diameters to transfer solid materials which are sensitive to the effects of air and moisture.

What is claimed is:

1. In a leakproof telescoping conduit adaptable for conveying air and moisture sensitive solid materials which comprises in combination a first rigid conduit adaptable at one end for making a tight connection with an aperture and slideably connected at the other end to a second rigid conduit larger in diameter than the first rigid conduit said second rigid conduit adaptable at the end opposite the slideable connection for making a tight connection with an aperture, said second rigid conduit having sealably connected thereto an impermeable flexible conduit said impermeable flexible conduit disposed over the first rigid conduit and sealably connected to the first rigid conduit some distance from the slideable connection the improvement which comprises providing said second rigid conduit with adjustable means at the slideable connection for holding and compressing packing to control the frictional forces at the slideable connection and to prevent leaks at the slideable connection.

2. The leakproof telescoping conduit of claim 1 wherein said second rigid conduit has conduit guides in the form of collars disposed contiguously to the interior surface, to maintain the rigid conduits in substantial alignment.

3. The leakproof telescoping conduit of claim 2 wherein the conduit guides are formed of polymeric material.

4. The leakproof telescoping conduit of claim 2 wherein the conduit guides are formed from Teflon.

5. The telescoping conduit of claim 1 wherein the second rigid conduit has disposed at the slideable connection flange means for holding and compressing packing to prevent leaks and control the friction at the slideable connection, said flange means having provision for making a leak tight connection to the impermeable flexible conduit, and wherein there are contiguously disposed to the interior surface of said second rigid conduit, collars of polymeric material to maintain the conduits in substantial alignment.

6. The telescoping conduit of claim 1 wherein the second rigid conduit has disposed at the slideable connection flange means for holding and compressing packing to prevent leaks and control the friction at the slideable connection, said flange means having provision for making a leak tight connection to the impermeable flexible conduit, and wherein there are contiguously disposed to the interior surface of said second rigid conduit collars of polymeric material to maintain the conduits in substantial alignment and wherein said first rigid conduit has disposed at the end within the second rigid conduit an enlarged section which acts as a stop to prevent withdrawl of the first rigid conduit from within the said second rigid conduit at the slideable connection.

7. The telescoping conduit of claim 1 wherein the second rigid conduit has disposed at the slideable connection flange means for holding and compressing packing to prevent leaks and control the friction at the slideable connection, said flange means having provision for making a leak tight connection to the impermeable flexible conduit, and wherein there are contiguously disposed to the interior surface of said second rigid conduit collars of polymeric material to maintain the conduits in substantial alignment and wherein said first rigid conduit has disposed at the end within the second rigid conduit an enlarged section which acts as a stop to prevent withdrawl of the first rigid conduit from within the second rigid conduit through the slideable connection and wherein said first rigid conduit has disposed at the enlarged section a conventionally mounted wiper ring which moves adjacent to the interior surface of the second rigid conduit to prevent buildup of material which can impede the relative movement of the rigid conduits.

* * * * *